United States Patent [19]

Allison

[11] 4,348,948
[45] Sep. 14, 1982

[54] COOKING APPARATUS

[75] Inventor: Clint Allison, Wichita Falls, Tex.

[73] Assignee: Hager and Allison Corp., Wichita Falls, Tex.

[21] Appl. No.: 116,050

[22] Filed: Jan. 28, 1980

[51] Int. Cl.³ .................. A21B 1/24; A47J 37/04; A23B 4/04
[52] U.S. Cl. .................. 99/339; 99/340; 99/447; 99/479; 99/482; 126/18; 126/79
[58] Field of Search .................. 99/339–341, 99/444, 446, 447, 467, 473, 477, 479–482; 126/17, 18, 27, 28, 67, 79

[56] References Cited

U.S. PATENT DOCUMENTS

| 777,467 | 12/1904 | Yuncker . | |
|---|---|---|---|
| 1,072,231 | 9/1913 | Howell . | |
| 1,189,818 | 7/1916 | Holloway | 126/18 |
| 3,217,634 | 11/1965 | Fox | 99/339 |
| 3,435,754 | 4/1969 | Lohr et al. . | |
| 3,477,360 | 11/1969 | Raney | 99/339 |
| 3,524,403 | 8/1970 | Treloar et al. | 99/339 |
| 3,552,299 | 1/1971 | Patoka | 99/339 |
| 3,747,513 | 7/1973 | Seelbach | 99/476 |
| 3,882,767 | 5/1975 | Oyler et al. | 99/339 |
| 3,991,666 | 11/1976 | Tidwell et al. | 99/446 |
| 4,076,008 | 2/1978 | Deaton | 99/447 |
| 4,232,597 | 11/1980 | Perrine et al. | 99/482 |

Primary Examiner—Philip R. Coe
Assistant Examiner—Timothy F. Simone
Attorney, Agent, or Firm—Burns, Doane, Swecker & Mathis

[57] ABSTRACT

A cooking apparatus comprises a firebox for producing heat and smoke, and a smoke oven forming a cooking chamber therein. A plurality of vertically spaced shelves are disposed within the chamber for carrying food to be cooked. The shelves are rotated about a generally vertical axis. A heat shield is positioned beneath one of the shelves and above another of the shelves to retard the travel of heat to and from the space above such other shelf. First and second vertically spaced openings are provided in the chamber in communication with the firebox to conduct heat and smoke into the chamber. The first opening is disposed above the heat shield and the second disposed below the heat shield. Adjustable gates are provided for opening and closing the openings independently to regulate the passage of heat and smoke therethrough.

12 Claims, 7 Drawing Figures

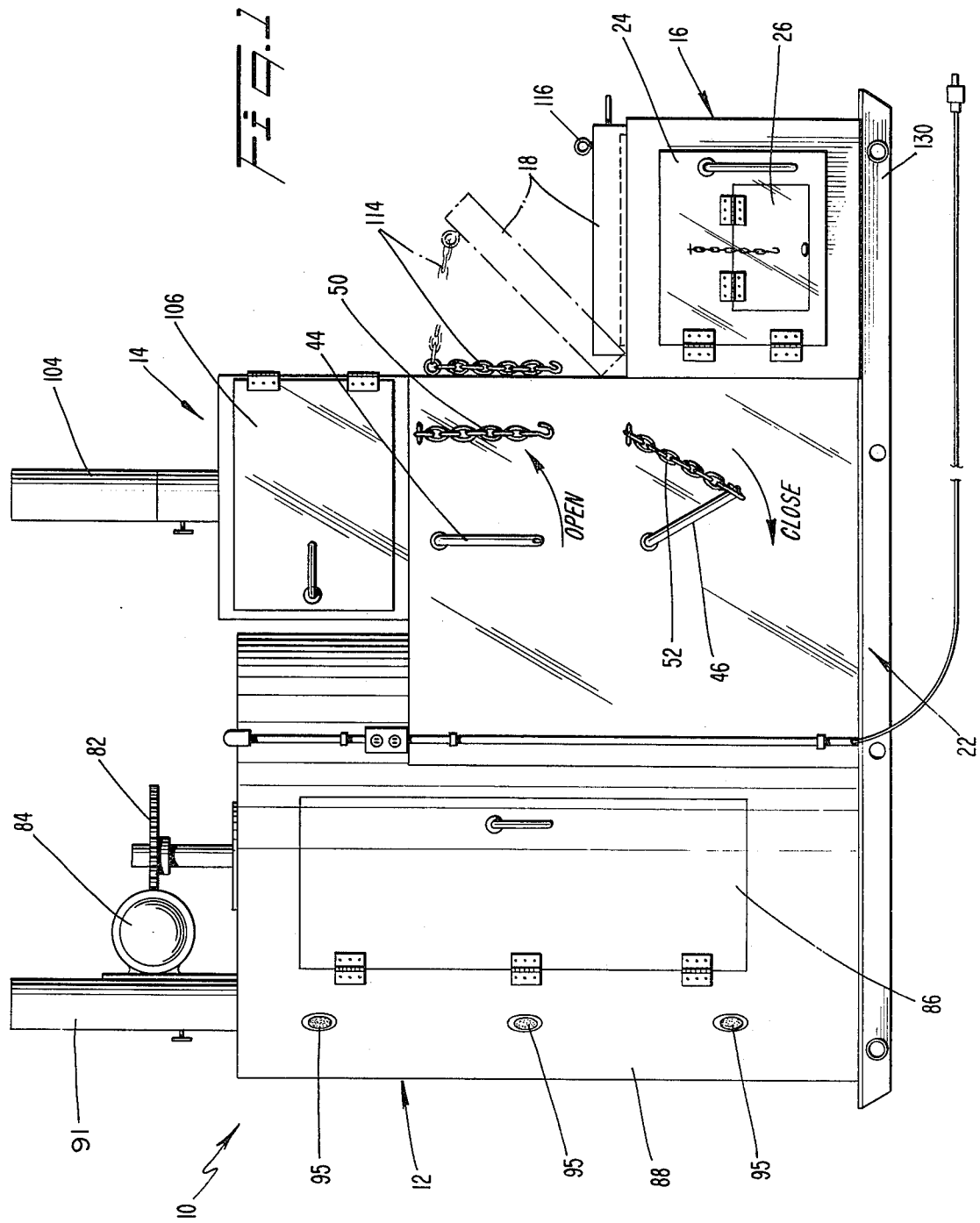

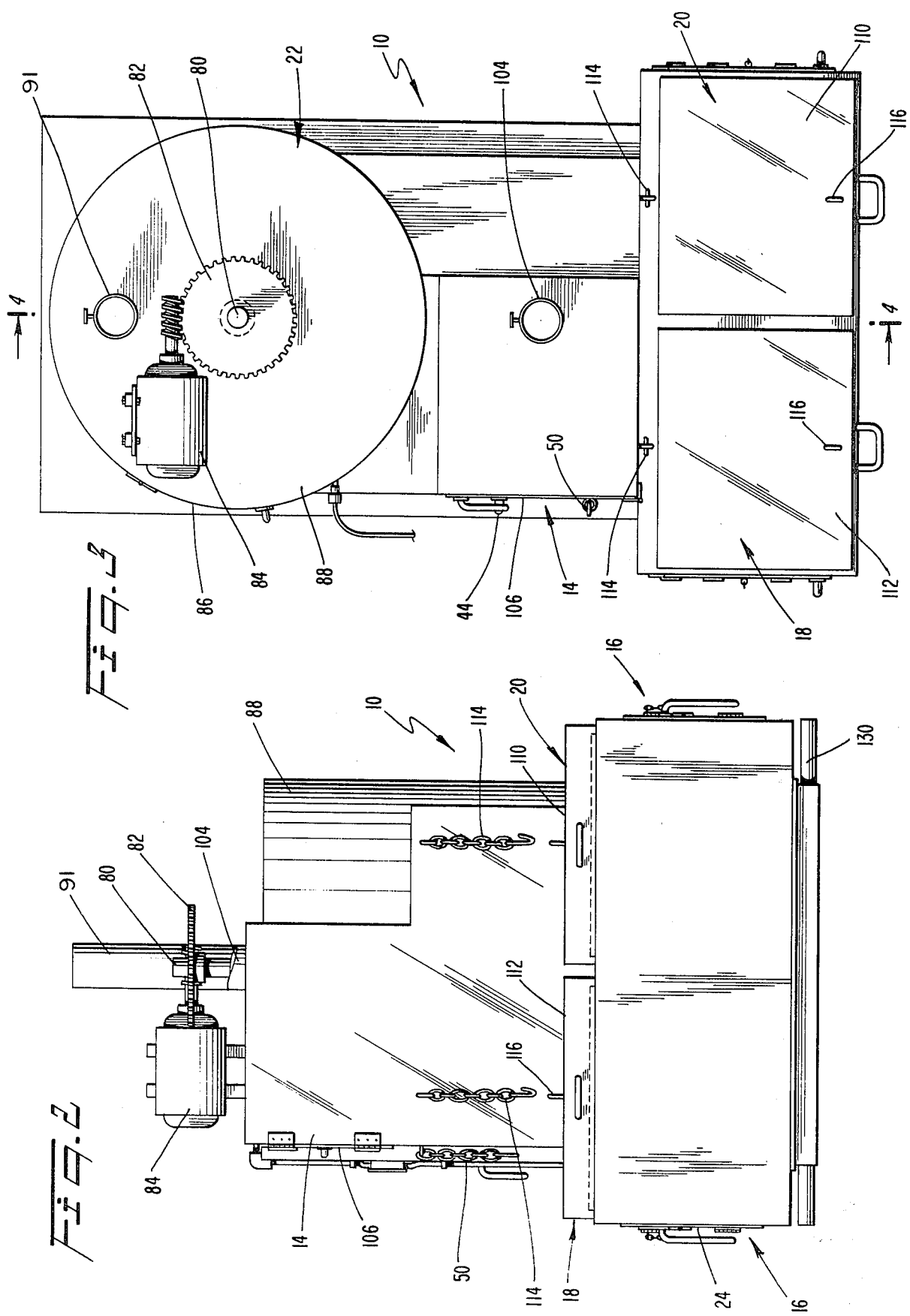

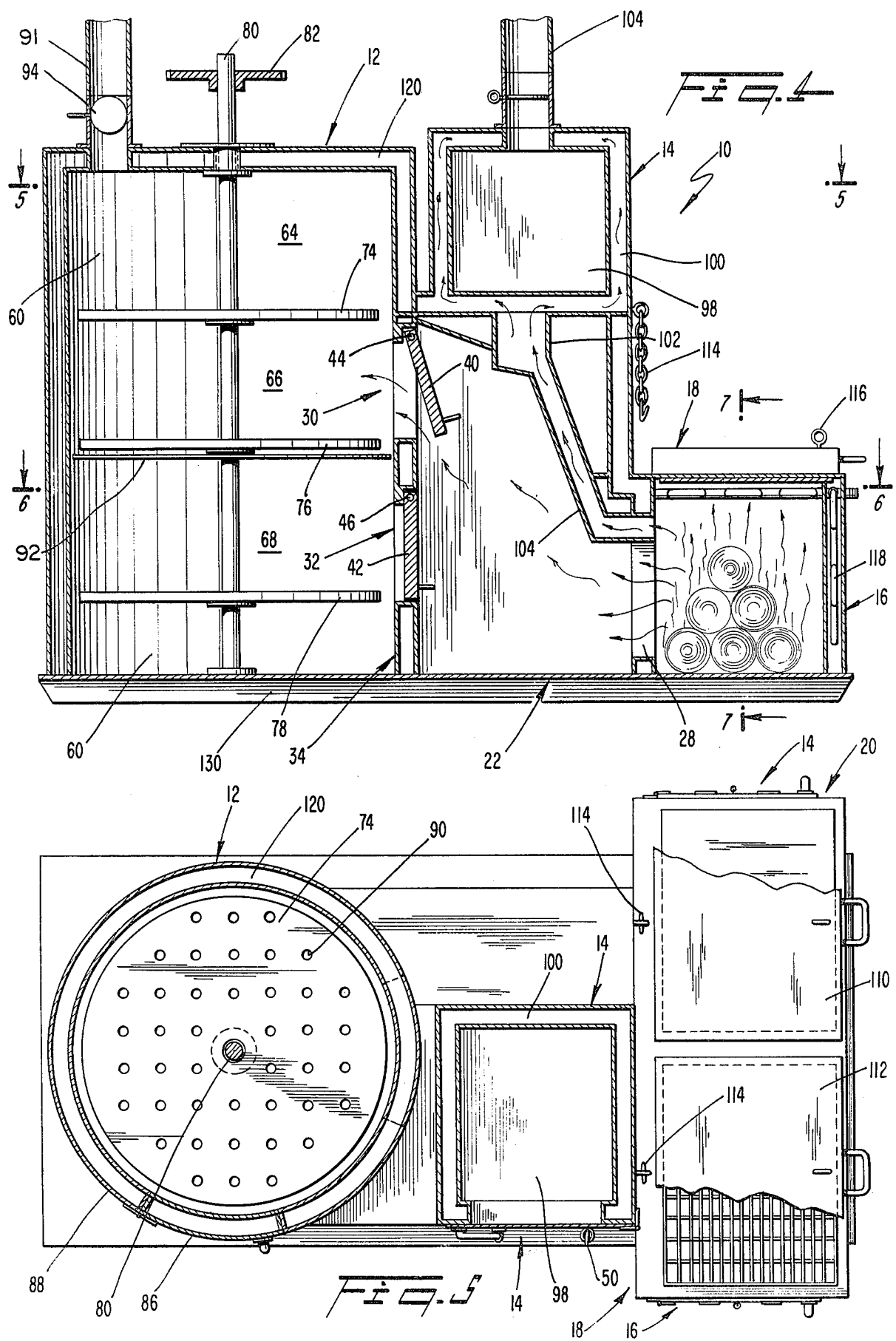

COOKING APPARATUS

BACKGROUND AND OBJECTS OF THE INVENTION

The present invention relates to cooking apparatus, especially to ovens which impart a smoke flavor to meats while they are being cooked.

Smoke ovens function to impart a smoke flavor to meat by cooking the meat in a smoke-filled atmosphere. It is conventional, for example, to provide a firebox in which wood is burned to generate smoke and heat, and to deliver the smoke and heat to an adjacent smoke oven. The oven contains vertically spaced rotary shelves on which the meat is placed and continually rotated at slow speed in the hot, smoky atmosphere. The shelves may contain openings to assure that smoke reaches all sides of the meat.

In such ovens it can be difficult to regulate the temperature throughout the cooking chamber so that the meat on all shelves is cooked at a constant uniform temperature.

It is also difficult to provide constant but different temperatures within the cooking chamber to enable different types of meat to be cooked at their individual cooking temperatures.

Commercial or high volume cooking facilities may require that other types of cooking operations, such as baking, charbroiling and frying for example, be carried out simultaneously with the roasting of meat. It would be desirable to enable all of those functions to be performed simultaneously on a common unit heated by a common heat source.

It is, therefore, an object of the present invention to minimize or eliminate problems of the types discussed above.

It is another object of the invention to provide a smoke oven which cooks similar meats at a uniform constant temperature throughout the cooking chamber, or different meats at different constant temperatures within the cooking chamber.

It is an additional object of the invention to enable different types of cooking functions to be performed at a common unit heated by a common source.

It is a further object of the invention to provide apparatus for simultaneously smoke roasting, baking, charbroiling and/or frying foods from a common source of heat.

SUMMARY OF THE INVENTION

These objects are achieved by the present invention which involves a cooking apparatus comprising a firebox for producing heat and smoke, and a smoke oven forming a cooking chamber therein. A plurality of vertically spaced shelves are disposed within the chamber for carrying food to be cooked. The shelves are rotated about a generally vertical axis. A heat shield is positioned beneath one of the shelves and above another of the shelves to retard the travel of heat to and from the space above such other shelf. First and second vertically spaced openings are provided in the chamber in communication with the firebox to conduct heat and smoke into the chamber. The first opening is disposed above the heat shield and the second disposed below the heat shield. Adjustable gates are provided for opening and closing the openings independently to regulate the passage of heat and smoke therethrough.

Preferably, the apparatus includes a dutch oven, charbroiler grill and griddle all heated by the firebox.

THE DRAWING

These and other objects and advantages of the invention will become apparent from the following detailed description of a preferred embodiment thereof in connection with the accompanying drawings in which like numerals designate like elements, and in which:

FIG. 1 is a side elevational view of a cooking unit according to the present invention;

FIG. 2 is an end elevational view of the cooking unit, depicting in particular the charbroiler and griddle components;

FIG. 3 is a plan view of the cooking unit;

FIG. 4 is a cross-sectional view through the cooking unit, depicting an arrangement of the baffles for creating a lower temperature in the lowermost cooking chamber;

FIG. 5 is a cross-sectional view taken along line 5—5 of FIG. 4;

DETAILED DESCRIPTION OF A PREFERRED EMBODIMENT OF THE INVENTION

Figure 6:
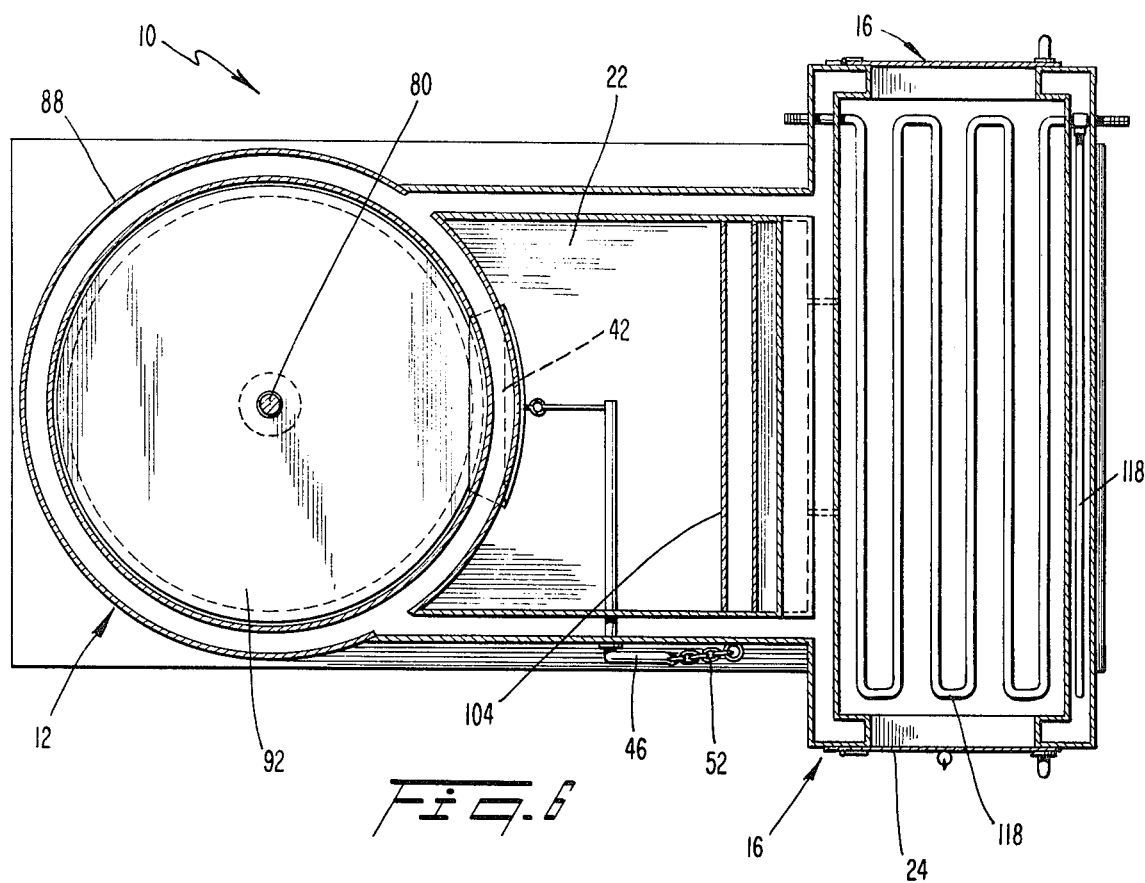
FIG. 6 is a cross-sectional view taken along line 6—6 of FIG. 5.
Figure 7:
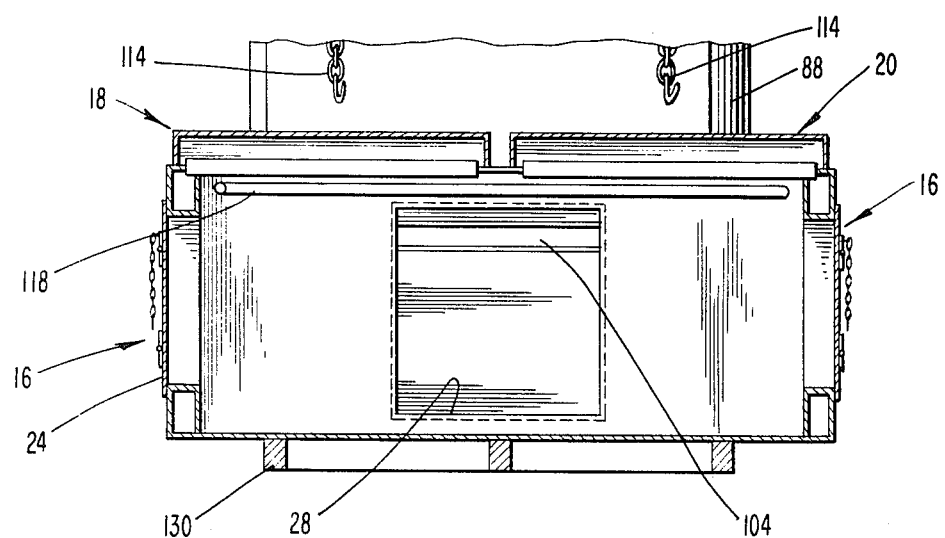
FIG. 7 is a cross-sectional view taken along line 7—7 of FIG. 6.

A cooking assembly 10 according to the present invention comprises a smoke oven 12, a dutch oven 14, a firebox 16, a charbroiler 18, a griddle 20 (FIGS. 5, 7), and a smoke and heat distribution chamber 22. The firebox 16 includes an inner wood-burning chamber which is accessible from the outside by a front door 24 having a quick-access hatch 26.

A side of the firebox bordering the heat distribution chamber contains an opening 28 so that heat and smoke travel from the firebox into the heat distribution chamber 22.

The smoke oven 12 communicates with the distribution chamber 22 by means of two openings 30, 32 in a common side 34 between the smoke oven and the distribution chamber. At the openings 30, 32 there are pivotably mounted baffles 40, 42. Each baffle is sized to close the associated opening 30 or 32 when in a closed position.

A pair of control levers 44, 46 are connected to the baffles and are rotatably mounted in the cylindrical side wall 48 of the distribution chamber to enable the baffles to be manually actuated. Chains 50, 52 are anchored to the side wall 48 and are releasably connectible to the control levers 44, 46 to hold the baffles in selective open positions. Release of the chains enables the baffles to gravitate to a closed position.

When the baffles are open, smoke and heat flows freely into the smoke oven at an elevation corresponding to the elevation of the respective baffles.

The smoke oven includes an inner chamber 60 divided into a plurality of cooking levels or compartments 64, 66, and 68 by a plurality of food supports preferably in the form of shelves which include vertically spaced plates 74, 76, 78. Any number of shelves can be provided, depending upon the quantity and height of compartments desired. The shelves are fixedly connected to an upright shaft 80 extending axially through the cylindrical smoke oven. A gear 82 connected to the upper end of the shaft 80 is drivingly connected with an output shaft of a motor 84 which continually rotates the shaft 80 and the shelves 74–78.

Access to the shelves is provided by a door 86 in a cylindrical side wall 88 of the smoke oven so that meats can be placed onto, and removed from, the shelves.

The shelves are provided with apertures 90 (FIG. 5) to allow smoke to pass upwardly through meat sitting on the shelf. The outer periphery of each shelf is spaced from the side wall of the smoke oven to permit the passage of smoke.

The lowermost opening 32 opens directly into the lowermost compartment 68. A heat shield 92 is mounted on the shaft 80 at an upper portion of the lowermost compartment. The heat shield 92 is formed of thin sheet steel, such as ten gage steel for example, containing no apertures, and has its outer periphery lying closely adjacent the side wall of the smoke oven. A small gap is disposed between the heat shield 92 and the shelf 76 of the next compartment 66 to enable smoke to pass therebetween and through the apertures 90 of the shelf 76. The heat shield 92 extends radially beyond the shelves to catch grease drippings therefrom.

The heat shield performs two important functions, the first of which occurring when it is desired to cook different kinds of meats requiring different cooking temperatures. In such case, meat requiring the lower cooking temperature, such as turkey or ham for example, is placed on the lowermost shelf 78, whereas the meat requiring a higher cooking temperature, such as beef for example, is placed on shelves thereabove. The baffles 40, 42 are opened selective amounts to set the desired cooking temperatures. The heat deflector minimizes the transfer of heat from the upper compartments to the lower compartment, thereby preventing overheating of the latter. The temperature in the uppermost compartment 64 is hotter than that in the intermediate compartment, so the larger pieces of meat can be placed in the former for faster cooking.

A second advantage of the heat shield occurs when a common cooking temperature is desired in all compartments 64, 66, 68, such as to cook the same type of meat in all compartments. In that case, the upper baffle 40 is closed and the lower baffle 42 is opened. The heat shield retards the rise of heat (which otherwise would result in the upper compartments being excessively hotter than the lower compartment). Instead, a relatively uniform temperature is achieved in the entire chamber 60.

At the top of the smoke oven a flue 91 is provided for discharging smoke and heat from the chamber 60. The flue is provided with a valve 94 to regulate the flow of smoke and heat through the chamber. Importantly, the flue is situated to a side of the chamber opposite the smoke inlets 30, 32. This assures that smoke must traverse essentially the entire chamber as it passes therethrough, to create a uniform smoke atmosphere therewithin.

Thermostats 95 are placed along the smoke oven so that the temperature within each compartment can be monitored.

The dutch oven 14 includes a cooking space 98 surrounded by a heat channel 100. The heat channel 100 communicates with the firebox 16 by means of a duct 102 which effectively blocks off the upper portion of the distribution chamber. The lower wall 103 of the duct 101 guides smoke and heat to the smoke oven. A valved flue 104 at the top of the channel 100 discharges heat. By opening the flue a desired amount, the temperature within the cooking space can be regulated. A door 106 provides access to the cooking space. With the flue open, the spaces become hot enough to bake cakes, pie, bread, etc. When the flue is closed, the space can be used as a warmer.

The charbroiler 18 and griddle 20 rest atop the firebox and are heated directly thereby. Hinged covers 110, 112 are provided atop the griddle and charbroiler which can be held in raised positions by chains 114 which attach to eyelets 116 on the covers.

The firebox can be provided with hot water pipes 118 which conduct water therethrough to be heated and used for various functions such as space heating, washing dishes, cleaning of machines and work area, etc.

Disposed around the top and sides of the smoke oven and dutch oven is a double-wall construction which provides a dead air space 120 of 4 inches for example, which performs an insulating function.

In operation, meats are placed on the revolving shelves and are rotated slowly by the motor 84, e.g., 180 turns per hour. All sides of the meat are thus cooked uniformly and simultaneously at a controlled heat, and the meat is not required to be turned or touched until removed. Uniform cooking of the meat in this fashion results in significantly less shrinkage of the meat. Heat is controlled by suitable actuation of the baffles 40, 42 and the valved flue 91. The heat shield assures that proper temperatures are achieved even in the lowermost compartment 68. That is, when the upper baffle 40 is open and the lower baffle 42 is closed, to reduce the temperature in the lower chamber, the upper surface of the heat shield reflects heat back-up into the upper chambers to prevent an excessive temperature rise in the lower compartment. When the upper baffle 40 is closed and the lower baffle 42 is open, to provide a generally uniform temperature in the chamber 60, the lower surface of the heat shield deflects heat back into the lower chamber 68 to retard the escape of heat which otherwise would be too rapid to maintain a generally uniform temperature in the chamber 60.

Smoke from the distribution chamber passes upwardly through the apertures 90 in the shelves and completely surrounds the meat to impart a smoked flavor to the meat. A uniform smoke environment within the chamber 60 is produced by the placement of the flue 91 to the side of the chamber opposite the openings 30, 32.

Foods can be simultaneously baked or warmed within the dutch oven 14 by a suitable regulation of the flue 104. Heat for the dutch oven is also delivered by the distribution chamber 22.

Other foods may be simultaneously charbroiled or fired on the charbroiler 18 and griddle 20 which are heated directly by the firebox.

Water can be heated by being passed through the pipes 118 in the firebox and used for various functions requiring hot water.

It will thus be appreciated that the cooking unit according to the present invention is relatively compact and can be rendered mobile by the provision of wheels. Thus, the unit on a common frame 130 of the unit can be wheeled onto a carrier vehicle and transported to a given location while the food is being cooked. The unit cooks meats with less than the usual shrinkage due to the uniform temperatures which can be achieved and within which the meat is rotated. Moreover, with little effort, the smoke oven can be switched from single temperature cooking to plural temperature cooking. The unit is capable of virtually all types of cooking, by means of a plurality of interconnected cooking components, all fueled by a common source.

Although the invention has been described in connection with a preferred embodiment thereof, it will be appreciated by those skilled in the art that additions, modifications, substitutions, and deletions not specifically described may be made without departing from the spirit and scope of the art as described in the appended claims.

What is claimed is:

1. A cooking apparatus comprising:
   means for producing heat and smoke,
   a smoke oven forming a cooking chamber therein,
   a plurality of vertically spaced food support means disposed within said chamber for carrying food to be cooked,
   means for rotating said food support means about a generally vertical axis,
   heat shield means positioned beneath one of said food support means and above another of said food support means to retard the travel of heat to and from the space above said other food support means,
   first and second vertically spaced openings in said chamber communicating with said heat and smoke producing means to conduct heat and smoke into said chamber, said first opening communicating with said chamber at a first location above said heat shield and said second opening communicating with said chamber at a second location below said heat shield, and
   adjustable gate means for opening and closing said openings independently of one another to independently regulate the passage of heat and smoke through said openings and into said chamber.

2. Apparatus according to claim 1 including a valved exhaust flue at an upper end of said chamber and at a side thereof opposite said openings.

3. Apparatus according to claim 1, wherein said heat shield means is rotatable along with said food support means.

4. Apparatus according to claim 1, wherein said rotating food support means each comprise an apertured plate, said means including a vertical shaft disposed centrally within said chamber, said plates connected to said shaft, and a motor for rotating said shaft.

5. Apparatus according to claim 1, wherein said gate means comprises first and second swingable baffles.

6. Apparatus according to claim 1, wherein said heat shield means comprises a solid thin sheet of steel.

7. Apparatus according to claim 1, wherein said heat and smoke producing means comprises a firebox, a heat/smoke distribution chamber interconnecting an outlet of said firebox and said openings, and a dutch oven disposed above said distribution chamber, said dutch oven including an inner cooking space and heat conducting channel therearound, means communicating said channel with said firebox, and a valved exhaust flue at a top of said channel.

8. Apparatus according to claim 7, including a charbroiler and a griddle mounted atop said firebox to be heated directly thereby.

9. Apparatus according to claim 8, wherein said smoke oven, distribution chamber, dutch oven, firebox, charbroiler, and griddle are interconnected as a common unit.

10. Apparatus according to claim 9, including water circulating pipes in said firebox for heating water.

11. Apparatus according to claim 1, including a charbroiler and a griddle mounted atop said firebox to be heated directly thereby.

12. Apparatus according to claim 1, wherein said food support means comprises an apertured shelf, there being at least three shelves including a lowermost shelf disposed adjacent the lowermost opening, and the next higher shelf disposed above the next higher opening.

* * * * *